United States Patent Office 3,102,122
Patented Aug. 27, 1963

3,102,122
PROCESS OF PREPARING GRISEOFULVIC ACID
Thomas Walker, Wembley, England, assignor to Glaxo Group Limited, Greenford, England, a British company
No Drawing. Filed Dec. 6, 1960, Ser. No. 73,972
Claims priority, application Great Britain Dec. 9, 1959
7 Claims. (Cl. 260—346.2)

The present invention concerns an improved process for the production of griseofulvic acid.

Griseofulvin is known to have valuable anti-fungal properties, and finds application in the treatment of human and animal diseases and in agriculture. Having regard to the valuable properties of griseofulvin, it has become of considerable interest to prepare close analogues related to griseofulvin, several of which have been found to possess antifungal activity. A particularly useful intermediate in the production of various analogues of griseofulvin is griseofulvic acid (7-chloro-4:6-dimethoxy-2'-methylgrisan-3:4':6'-trione), which has the structure

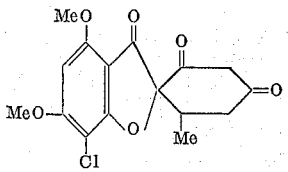

The use of griseofulvic acid as an intermediate to produce analogues of griseofulvin has for example been described by Duncanson et al. J.C.S. 1958, 2929, the biological activity of the analogues so obtained being reported by Crowdy et al., Biochem. J., 1959, 72, 241.

It has been proposed to prepared griseofulvic acid by the hydrolysis of griseofulvin, which has the structure

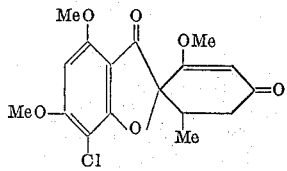

using ethanol and aqueous sulphuric acid to yield griseofulvic acid. However, this hydrolysis is generally slow, large reaction volumes are common, the subsequent working-up procedure lengthy, and the yield of product in purified form is often low.

It has now been found that griseofulvin can be converted to griseofulvic acid with improved results both as regards yield and convenience by hydrolysing griseofulvin with an aqueous strong acid in the presence of a liquid aliphatic acid and water. It has been found that by carrying out the acid hydrolysis of griseofulvin with a strong acid in a lower aliphatic acid, preferably at an elevated temperature, the product of the hydrolysis, griseofulvic acid, separates out in good yield from the reaction mixture at the reaction temperature or upon cooling. The product is therefore readily separated e.g. by filtration, and can thus be purified quite simply. The rate of the reaction is also frequently better than when using the prior process above referred to.

According to the invention, therefore, there is provided a process for the production of griseofulvic acid in which griseofulvin is hydrolysed by reaction with an aqueous strong acid in the presence of an aliphatic monocarboxylic acid containing from 1 to 5 carbon atoms. The acid used to cause hydrolysis is preferably a strong mineral acid, e.g. hydrochloric, sulphuric or perchloric acid, or a strong organic acid e.g. trichloracetic or p-toluene sulphonic acid.

By the term "strong acid" is meant an acid having a strength comparable with that of sulphuric acid as distinct from weak acids such as acetic acid.

The amount of water present during the reaction may be varied. In general, it is convenient to dissolve griseofulvin in the liquid aliphatic acid to yield a relatively concentrated solution (e.g. 0.2 g. per cc.) and then combine this solution with an aqueous strong acid. In general the strength and concentration of the strong acid will control the reaction conditions necessary, e.g. reaction time. Further, since it is preferable to work with as strong a solution of griseofulvin as possible, and having regard to the very poor solubility of this compound in water, it is undesirable that too much water should be present.

Thus it has been found that good results are obtained using approximately 3–8, preferably 5 volumes of aliphatic acid to 1 volume of aqueous mineral acid, whose strength may conveniently vary from about N/20 to 5 N.

Preferred aliphatic monocarboxylic acids for use in the present process are for example alkanoic acids, such as acetic, formic and propionic acids.

Particularly good results have been obtained using acetic acid and 2 N $H_2SO_4$ in a volume ratio of 5 to 1.

The process according to the invention is conveniently carried out by dissolving griseofulvin in the chosen aliphatic acid at an elevated temperature, e.g. 100° C., then adding an aqueous strong mineral acid, and maintaining the reaction mixture at the elevated temperature of for example 100° C. Upon completion of the reaction, the mixture is cooled, the precipitated griseofulvic acid filtered off, and then washed.

The process according to the invention is advantageous in several respects. Having regard to the relatively high solubility of griseofulvin in lower aliphatic acids and in suitable solvent systems of lower aliphatic acid/strong mineral acid/water, it is possible to work with relatively small reaction volumes. Since the product of the process, griseofulvic acid, has poor solubility in these solvent systems it separates in good yield without further treatment, such as distillation of the solvent. The yields obtainable by the process according to the invention are good. Thus it is possible to obtain yields of griseofulvic acid in excess of 90%. The process can also be conducted fairly rapidly, reaction times frequently being of the order of ½–1 hour.

In order that the invention may be well understood, the following examples are given by way of illustration only.

Example 1

Griseofulvin (50.0 g.) was dissolved in glacial acetic acid (250 ml.) by heating on the stream bath. 2 N aqueous sulphuric acid (50 ml.) was added, and the clear solution heated on the steam bath and stirred for 45 min. Colourless crystals of the product began to separate after a few minutes. The reaction mixture was cooled to room temperature, the solid filtered, washed with methanol (3 x 10 ml.) and ether (50 ml.) and dried in vacuo. Wt.=44.16 g. (92% theory), M.P. 262–3° C. (d.), $[\alpha]_D^{20}=+404°$ (c., 1.0 in 0.1 N $Na_2CO_3$ solution).

Example 2

A solution of griseofulvin (2.0 g.) in propionic acid (10 ml.) containing 2 N-hydrochloric acid (2.0 ml.) was heated on the steam bath at 100° for 45 min. The initially clear solution deposited crystals of the product during this period. After cooling to room temperature, the solid was filtered, washed with methanol and ether to give griseofulvic acid (1.72 g.; 89.5%), identified by M.P., $[\alpha]_D$ and infra-red spectrum.

Example 3

A solution of griseofulvin (2.0 g.) in acetic acid (10 ml.) containing trichloroacetic acid (0.65 g.) in water (2.0 ml.) was heated at 100° for 2 hr. The solution was cooled to room temperature and the solid collected as before to give griseofulvic acid (1.25 g.; 65%).

Example 4

A solution of griseofulvin (2.0 g.) in acetic acid (10 ml.) containing p-toluene sulphonic acid (0.7 g.) in water (2.0 ml.) was heated at 100° for 30 min. Cooling to room temperature and filtration gave griseofulvic acid (1.73 g.; 90%).

I claim:

1. A process for the production of griseofulvic acid which comprises the step of hydrolysing griseofulvin by reaction with an aqueous strong acid in the presence of an alkanoic acid having from 1 to 5 carbon atoms.
2. A process as claimed in claim 1 in which the strong acid is a mineral acid.
3. A process as claimed in claim 1 in which the strong acid is selected from the group consisting of hydrochloric acid, sulphuric acid, perchloric acid, trichloroacetic acid and p-toluene sulphonic acid.
4. A process as claimed in claim 1 in which a proportion of from 3–8 volumes of alkanoic acid per volume of aqueous strong acid is used.
5. A process as claimed in claim 1 in which the aqueous strong acid is from 0.5–5 normal.
6. A process as claimed in claim 1 in which the alkanoic acid is acetic acid.
7. A process as claimed in claim in which the griseofulvin is first dissolved in the alkanoic acid and the strong acid is subsequently added thereto.

References Cited in the file of this patent

Grove et al.: J. Chem. Soc., London (1932), part 3, pages 3951, 3955–6.